Sept. 16, 1969 P. F. MILLER 3,466,758
TEACHING MACHINE
Filed Dec. 12, 1966 3 Sheets-Sheet 1
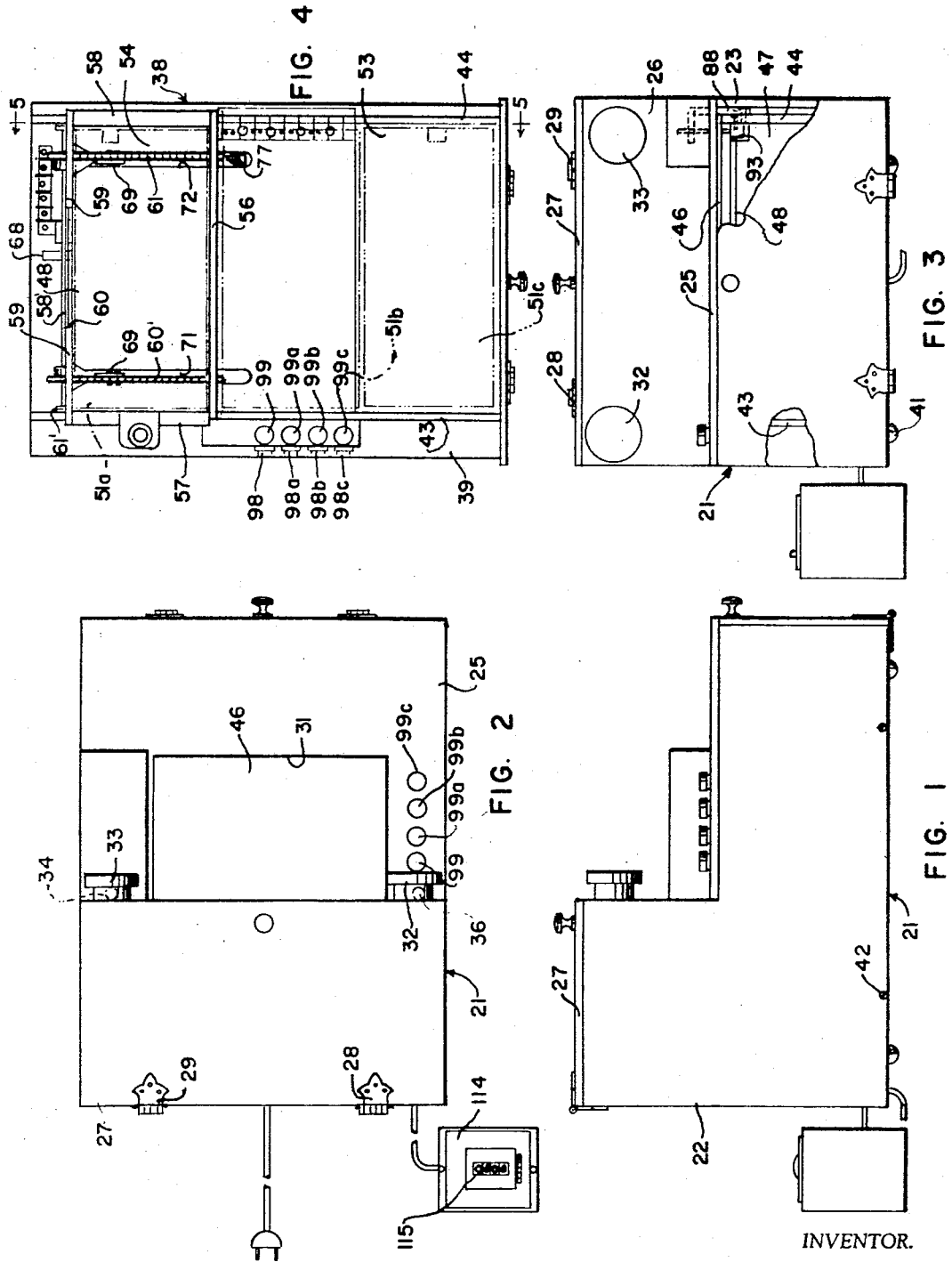
INVENTOR.
PAUL F. MILLER
BY Pearce & Schaeperklaus
Attorneys

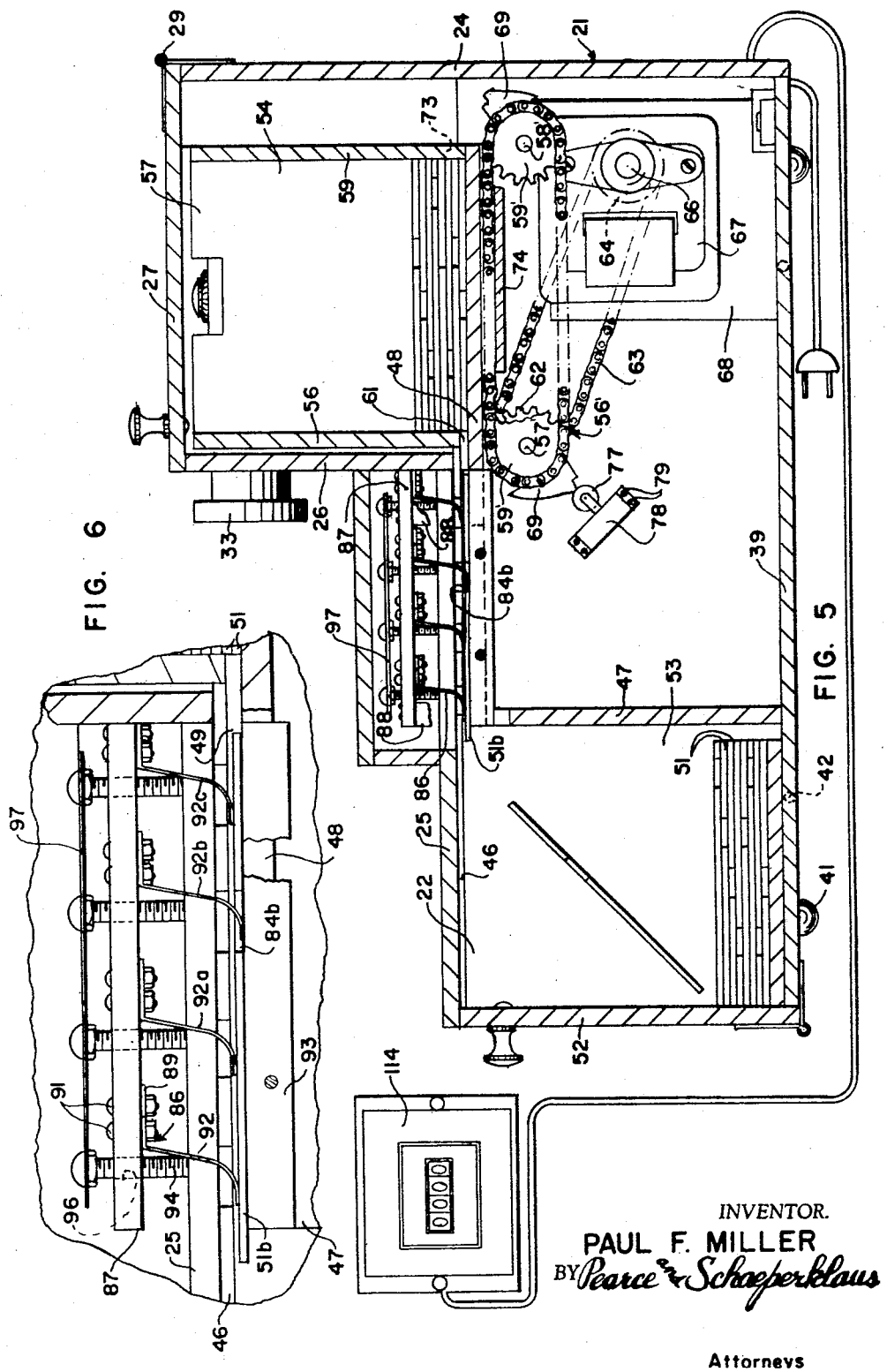

Sept. 16, 1969   P. F. MILLER   3,466,758
TEACHING MACHINE
Filed Dec. 12, 1966   3 Sheets-Sheet 3

INVENTOR.
PAUL F. MILLER
BY Pearce & Schaeperklaus
Attorneys

United States Patent Office 3,466,758
Patented Sept. 16, 1969

3,466,758
TEACHING MACHINE
Paul F. Miller, Anderson Township, Hamilton County,
Ohio (501 Carew Tower, Cincinnati, Ohio 45201)
Filed Dec. 12, 1966, Ser. No. 600,865
Int. Cl. G09b 3/02, 1/00
U.S. Cl. 35—8                           2 Claims

ABSTRACT OF THE DISCLOSURE

A teaching machine presents cards one at a time to the student, who registers his choice in response to a card-carried multiple choice problem. If correct, a new card is presented, and if incorrect, a counter is activated. The correct responses are notch-coded on the cards and sensed by novel leaf switching circuitry. A relay is provided for disabling the incorrect response counter during the advancement of a card.

---

This invention relates to a teaching machine.

An object of this invention is to provide a teaching machine which uses question cards each having plural choices and in which the user selects a choice or answer by operating a switch.

A further object of this invention is to provide a machine of this type in which the cards each operate a switching mechanism to cause advance of a card to reveal a new card when a "correct" selection is made and to register an "error" when an incorrect selection is made.

A further object of this invention is to provide such a machine in which each card is provided with a slot oriented with relation to the "correct" answer and in which a resilient switch leaf connected to the correct selection switch is arranged to extend through the slot into engagement with a contact plate forming a circuit when the "correct" selection is made to operate the card advancing mechanism.

A further object of this invention is to provide a machine of this type in which similar leaf switches connected to alternate selection devices make circuits to an error counting device when an incorrect selection is made.

The above and other objects and features of this invention will be apparent to those skilled in the art to which this invention pertains from the following detailed description and the drawings, in which:

FIG. 1 is a view in side elevation of a teaching machine constructed in accordance with an embodiment of this invention;

FIG. 2 is a plan view of the teaching machine illustrated in FIG. 1;

FIG. 3 is a view in front elevation of the teaching machine illustrated in FIGS. 1 and 2, a door being partly broken away to reveal internal construction;

FIG. 4 is a plan view of the machine illustrated in FIGS. 1–3 inclusive with an outer case removed, the position of a card in a feed bin being indicated in dot-dash lines, the position of a card at an operative station being shown in double dot-dash lines, the position of a card in a used card bin being shown in triple dot-dash lines;

FIG. 5 is a view in section on an enlarged scale taken generally on the line 5—5 in FIG. 4;

FIG. 6 is an enlarged fragmentary view in vertical section showing details of construction of switch mechanism of the teaching machine;

In the following detailed description and the drawings, like reference characters indicate like parts.

Figure 9:
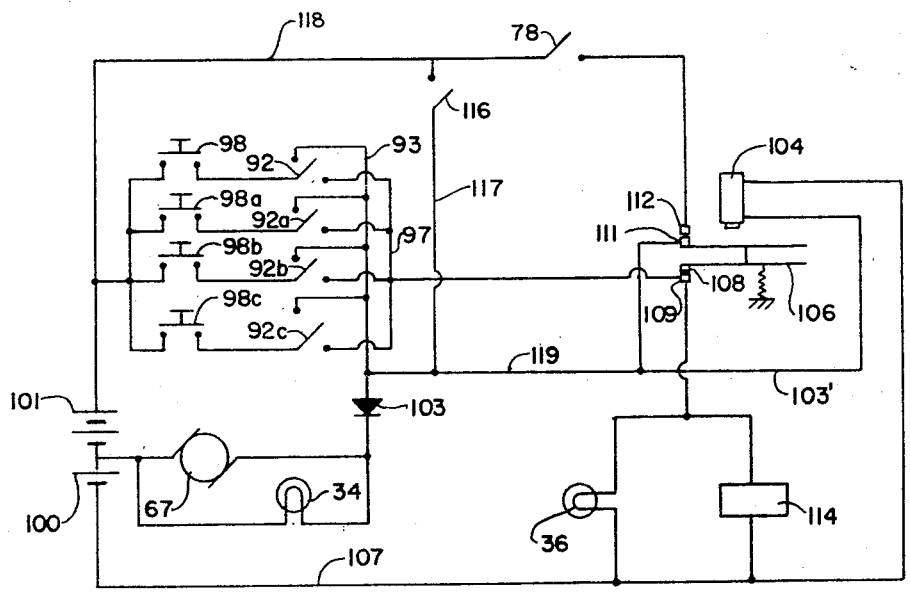
FIG. 9 is a schematic circuit diagram of the teaching machine.

In FIGS. 1, 2, and 3 is shown a teaching machine constructed in accordance with an embodiment of this invention which includes an outer case 21 including side panels 22 and 23 of generally L-shape, a back panel 24 (FIG. 5) and a generally U-shaped shelf panel 25 (FIG. 5) and an upright half-wall panel 26 (FIG. 3 and 5). An upper lid 27 hinged to the back panel 24 by hinges 28 and 29 covers the portion of the space inside the outer case betwen the back panel 24 and the half-wall panel 26. The shelf-panel 25 is cut away as indicated in FIG. 2 to form a rectangular window 31 therein adjacent the half-wall panel 26. Lamp housings 32 and 33 are mounted on the half-wall panel 26 adjacent opposite sides thereof, a lamp 34 (FIG. 9) in the lamp housing 33 being illuminated when a correct selection is made, a lamp 36 in the housing 32 being illuminated when an incorrect selection is made.

The outer case is mounted on a base assembly 38 (FIG. 4) which includes a base plate 39 supported on hemispherical feet 41 attached to the underside thereof. The side panels 22 and 23 are attached to the base plate 39 by fasteners 42. Side wall members 43 and 44 extend upwardly from the base plate 39. A horizontal plate 46 of transparent material is mounted on the side wall members 42 and 43 immediately below the shelf-panel 25. A portion of the transparent plate 46 underlies the window 31, as shown in FIG. 2.

A transverse wall 47 (FIG. 5) extends upwardly from the base plate 39 and spans the side wall members. The transverse wall 47 extends upwardly to a position spaced below the transparent plate 46. A horizontal card supporting plate 48 is supported at one end by the transverse wall 47 and spans the side wall members 43 and 44, a space 49 being formed between the transparent panel 46 and the card supporting plate 48 through which cards 51 can be advanced. A door 52, hinged to the base plate 39, when in a closed position as shown in FIG. 5, completes an enclosure 53 in which the cards 51 are collected when they have passed through the machine.

The cards are inserted in the machine through the upper lid 27 into a bin 54, which is mounted on the side wall members 43 and 44. The bin 54 includes a front wall 56, side walls 57 and 58 (FIG. 4) and a rear wall including sections 59 separated by a slot 60 therebetween. The front wall 57 terminates above the card supporting plate 48, as shown in FIG. 5, to provide a slot 61 through which cards can be advanced out of the bin 54.

The cards are advanced from the bin by a chain conveyor 56'. The chain conveyor 56' includes shafts 57' and 58' which carry sprocket wheels 59' on which conveyor chains 60' and 61' run. The shafts 57' and 58' are rotatably mounted in bearings 61 (only two of which are shown, FIG. 4) mounted in the side wall members 43 and 44. A drive sprocket wheel 62 (FIG. 5) is also mounted on the shaft 57, and a drive chain 63 runs on the drive sprocket wheel 62. The drive chain 63 is driven by a sprocket wheel 64 mounted on a motor shaft 66 and driven by a motor 67. The motor 67 is mounted on an upright panel 68 which in turn is mounted on the base plate 39. The conveyor chains 60 and 61 carry dogs 69 which can pass through slots 71 and 72 (FIG. 4) in the card supporting plate 48 and slots 73 (FIG. 5) in the rear wall sections 59. As the dogs progress along the slots 71 and 72, the chains are supported by a horizontal chain supporting plate 74, which spans the side wall members 43 and 44, and as the dogs advance along the slots 71 and 72, the dogs engage cards in the bin 54 (FIG. 4) to advance the cards from the position at which a card 51a is shown in dot-dash lines in FIG. 4 to an operative position at which a card 51b is shown in double-dot dash lines. Then, when another card is advanced, the card at the operative position is advanced to fall into the enclosure 53 to the position in which a card 51c is shown.

When a card has been advanced to the operative position of the card 51b, one of the dogs 61 engages a switch operator 77 (FIG. 5) to actuate a limit switch 78 which halts advance of the conveyor chains 60' and 61 under operation of the motor 67. The limit switch 78 is mounted adjacent the side wall member 44 by fasteners 79.

Figure 7:
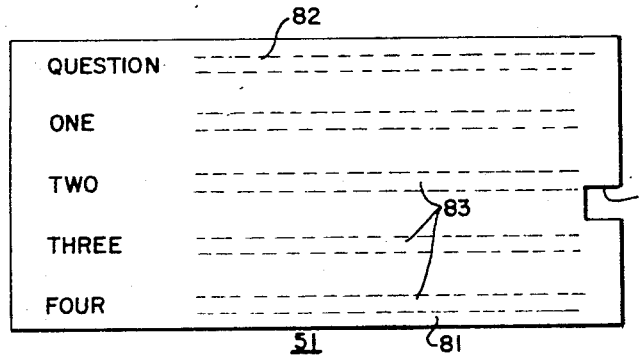
FIG. 7 is a plan view of a card used in connection with the teaching machine.
Figure 8:
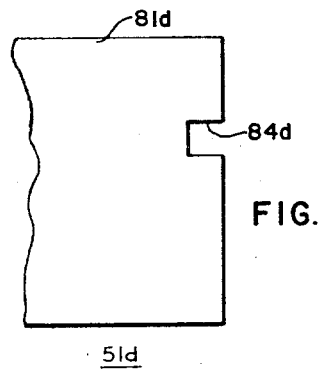
FIG. 8 is a fragmentary plan view of another card used with the teaching machine showing a slotted edge thereof.

The construction of one of the cards 51 is shown in FIG. 7. The card 51 has a rectangular body 81 on which a question 82 and plural responses 83 are printed. Along a right hand edge of the card 51 is provided a notch or slot 84 which is oriented with relation to a "correct" response to the question. In FIG. 8 is shown a card 51d having a body 81d and a notch 84d therein differently oriented for use with a differently oriented "correct" response. As the cards are advanced, the cards move past leaf switches 86 (FIGS. 5 and 6), and when a card stops at the operative station 51b, the notch 84b thereof is opposite one of the leaf switches 86.

The leaf switches 86 are mounted on an insulator bar 87 supported on uprights 88 which are attached to the side wall 44, as shown in FIG. 3. Each leaf switch 86 includes a head 89 (FIG. 6) which is attached to the underside of the bar 87 by fasteners 91, and a downwardly extending resilient leaf 92, which normally engages a contact bar 93 but can be displaced by one of the cards 51 in the manner the leaves 92 and 92a are shown in FIG. 6. As shown in FIG. 6, when one of the switch leaves is displaced be the card 51, the leaf engages one of a set of upright bolts 94. Each of the bolts 94 is mounted in an upright threaded bore 96 in the insulator bar 87 adjacent the switch leaf which is engageable therewith. The bolts 94 are linked by a connector 97.

As shown in FIG. 9, each of the switch leaves 92 is connected to one of a set of push button switches 98. As shown in FIG. 2, push buttons 99 associated with the push button switches 98 are mounted adjacent the window 31 and are arranged so that, when a card is at the operative position, one of the push buttons 99 is opposite each response on the card.

Operation of the teaching machine can best be understood by reference to FIG. 9. Power for the machine is supplied by appropriate sources of electric power 100 and 101. When a card 51 has been advanced to the operative position 51b (FIGS. 5 and 6), the leaf switches 92, 92a, and 92c (FIG. 6) are held in engagement with the bolts 94, 94a and 94c respectively and are in electrical connection with the connector 97. On the other hand, the leaf switch 92b is in engagement with the contact bar 93. If the push button 92b is depressed to close the switch 98b and record a "correct" response, a circuit is completed from the power source 101 through the contacts of the push button switch 98b, the leaf switch 92b, the contact bar 93, and a rectifier diode 103 to energize the motor 67. As the motor 67 runs, the lamp 34, being in parallel therewith, is illuminated to give a visual indication of the "correct" response as a new card is advanced from the bin 54 to the operative position 51b, and the used card is advanced to the enclosure 53. As the motor 67 starts, a circuit is also formed from the contact bar 93 through a lead 103', a coil 104 of a relay 106 and a lead 107 to actuate the relay and swing normally closed contacts 108–109 thereof to open position and normally open contacts 111–112 to closed position. As the conveyor chains advance, the limit switch 78 closes so that the motor 67 continues to run until the limit switch 78 is again opened as a cycle is completed, the motor being energized by a circuit from the power source 101 through the contacts of the limit switch 78, the normally open contacts 111–112 of the relay 106 and the rectifier 103. The relay coil continues energized until the limit switch 78 is opened through a hold-in circuit including the contacts of the limit switch 78, the normally open contacts 111–112 of the relay 106, the lead 103', the relay coil and the lead 107. The rectifier 103 stops back voltage from the motor 67 as the motor slows to a stop so that the machine is not actuated by voltage induced in the motor after power to the motor is cut off. When the limit switch 78 opens as a new card reaches the operative position, the circuits to the motor 67 and to the coil 104 of the relay 106 open, advance of the chain conveyors is halted and the machine is ready for the next cycle. On the other hand, if an "incorrect" response is made as by pushing the push button 99, a circuit is formed from the power sources through the contacts of the push button switch 98, the leaf switch 92, the connector 97, the normally closed contacts 108–109, a counter 114, and the lead 107 to actuate the counter 114 and register an "incorrect" response. At the same time, the lamp 36, which is connected in parallel with the counter 114 is illuminated to register the "incorrect" response visually. The counter 114 can be of the type which has a register 115 (FIG. 2) which visually indicates the number of "incorrect" responses made. During operation of the conveyor chains, the contacts 108–109 are open to prevent recording of an "incorrect" response until a card is fully advanced and in proper operating position. An auxiliary push button switch 116 can be provided in a lead 117 connecting leads 118 and 119. When the auxiliary switch 116 is closed, a card is advanced without need for selecting a response as when the machine is being set in operation or when a card is to be displaced without a selection being made.

During operation of the machine, the student reads the question and the plural responses on a card through the window 31. The student selects a response by depressing the push button 99 opposite the selected response. If a "correct" response is selected, the "correct" lamp 34 is illuminated and a new card is advanced into position beneath the window 31. If an "incorrect" response is selected, the "error" lamp 36 is illuminated and an "error" is recorded on the counter 114. The window 31 is so constructed that only the questions and responses are visible and the notches in the cards cannot be observed through the window 31.

The machine can be used as a teaching aid or as a testing machine, and the number of "errors" recorded on the counter 114 indicates the number of misses or error selections.

The teaching machine illustrated in the drawings and described above is subject to structural modification without departing from the spirit and scope of the appended claims.

Having described my invention, what I claim as new and desire to protect by Letters Patent is:

1. A teaching machine which comprises means for advancing cards one at a time to an operative station, each of said cards having a question and a plurality of selectable responses thereon, there being a slot in each card oriented with relation to a selectable correct response, leaf spring switches at the operative station arranged to extend through said slots in the cards, a first contact means engageable by a leaf spring switch extending through a slot in a card, a second contact means engageable by a leaf spring switch engaged by a card, the second contact means including an elongated contact element adjacent each leaf spring switch, each leaf spring switch being engageable with the adjacent elongated contact element when displaced by a card at the operative station, an operator controlled switch connected to each leaf spring switch, card advancing mechanism electrically connected to one of the contact means, error registering mechanism electrically connected to the other contact means, the card advancing means being energized when the operator actuates the operator controlled switch associated with the correct selection for a card at the operative station, the error registering means being energized when the operator selects another operator controlled switch.

2. A teaching machine which comprises means for advancing cards one at a time to an operative station, each of said cards having a question and a plurality of selectable responses thereon, there being a slot in each card oriented with relation to a selectable correct response, leaf spring switches at the operative station arranged to extend through said slots in the cards, a first contact means engageable by a leaf spring switch extending through a slot in a card, a second contact means engageable by a leaf spring switch engaged by a card, an operator controlled switch connected to each leaf spring switch, card advancing mechanism electrically connected to one of the contact means, error registering mechanism electrically connected to the other contact means, the card advancing means being energized when the operator actuates the operator controlled switch associated with the correct selection for a card at the operative station, the error registering means being energized when the operator selects another operator controlled switch, the machine including a relay which is actuated by the card advancing means, the relay disabling the error registering mechanism when a card is being advanced to the operative station.

References Cited

UNITED STATES PATENTS

| | | | |
|---|---|---|---|
| 1,977,178 | 4/1935 | Johnson | 35—48 |
| 2,528,828 | 11/1950 | Henry | 35—48 |
| 2,564,089 | 8/1951 | Williams et al. | 35—9 |
| 2,965,975 | 12/1960 | Briggs | 35—9 |
| 3,095,654 | 7/1963 | Cummings | 35—9 |
| 3,096,592 | 7/1963 | Schuster | 35—48 |
| 3,212,199 | 10/1965 | Clark | 35—9 |
| 3,221,418 | 12/1965 | Hoernes et al. | 35—9 |

EUGENE R. CAPOZIO, Primary Examiner

W. W. NIELSEN, Assistant Examiner